United States Patent

[11] 3,584,671

[72] Inventor Donald J. Kampa
994 West Montana, St. Paul, Minn. 55117
[21] Appl. No. 809,610
[22] Filed Mar. 24, 1969
[45] Patented June 15, 1971

[54] SELF-SEALING VALVE FOR INFLATABLE OBJECT
9 Claims, 7 Drawing Figs.
[52] U.S. Cl. ............................................. 152/429, 137/223
[51] Int. Cl. ....................................... B60c 29/00, F16k 7/10
[50] Field of Search ............................................. 152/429; 137/223; 9/311, 319, 320

[56] References Cited
UNITED STATES PATENTS
3,034,558  5/1962  Steer et al. ..................... 152/429
3,067,425  12/1962  Colley ........................... 2/6

Primary Examiner—Arthur L. La Point
Assistant Examiner—Robert Saifer
Attorney—Schroeder, Siegfried & Ryan ABSTRACT: A self-sealing valve for an inflatable object such as a vehicle tire or tube in which the valve is comprised of an aperture through the wall of the casing of the tire or tube and includes a thin flexible and deformable piece of material sealed to the inner wall of the casing or tube and having an aperture therein offset from the aperture in the casing or tube which will be displaced upon entrance of a hollow tube through the apertures in the casing and thin piece of material to allow entrance of air into the casing. The pressure of the inflating air or medium introduced through the hollow tubular member will cause the thin flexible and deformable piece of material to conform to the inner wall of the casing to seal the aperture therethrough.

PATENTED JUN 15 1971

3,584,671

INVENTOR.
DONALD J. KAMPA
BY Schroeder, Siegfried
& Ryan
ATTORNEYS

SELF-SEALING VALVE FOR INFLATABLE OBJECT

My invention relates to pneumatic valves for inflatable objects and more particularly to a simplified self-sealing valve for an inflatable object, such as a vehicle tire or tube.

Pneumatic valves for tires of the tube and tubeless type have, in the past, generally employed a valve stem with a valve therein and forming a part thereof which is made of a metallic body construction and having a rubber material bonded thereto. This is in turn bonded or otherwise secured to the casing of the tube or tire or is mounted in the wheel support for the same. The use of metal bonded to rubber creates a friction which fatigues under heat causing early failure or breakdown at this point. In addition, such valve stems for certain applications are subject to breakage because of environmental conditions in which the tires or inflatable objects are used. With large vehicles and with certain types of wheel covers, such valve stems are inaccessible and inconvenient from the standpoint of inflation of the tires. In addition, the valves employ moving parts which are subject to wear causing leakage at this point. Still other pneumatic valves have employed inserts through the wall of the tire or body with parts projecting beyond the surface of the same and such parts have been made of an all rubber material. Projections outside the exterior of the casing are subject to damage under certain environmental conditions loosening the plugs. Such constructions are normally costly and subject to leakage.

My improved self-sealing valve in the present invention employs no mechanically moving parts and no metallic parts and presents no projection to the exterior of the casing or surface of the inflatable object or tire. It employs merely a passage or aperture through the wall of the casing or tube and a cooperating thin elastic and deformable disc on the inner wall of the tube or casing having a similar aperture therethrough which is slightly offset from the aperture in the wall of the tube or casing so as to be nonoverlapping therewith. This provides a very simplified pneumatic valve which permits inflation of the tire by the insertion of a hollow tube or needle therethrough displacing the thin disc on the inner surface such that the needle or tube will extend through the aperture therein to permit inflation of the tire and which disc will return to its normal position when the needle is withdrawn and be sealed by the pressure within the tire for positive leakproof inflation. The construction provides no obstruction on the exterior wall of the surface and the valve may be located on the sidewalls of the casing or at any point in a tube and in the tread surface of a tire casing, as desired. Similarly, more than one such valve may be employed in a vehicle tire for convenience in filling. The improved pneumatic valve provides a minimum of unbalance in the tubular object or casing, a variety of locations for the same such that it may be accessible for filling and a rugged construction with no obstructions on the surface so that it may be used in all environments. This is particularly true of truck applications. Further, the improved and simplified pneumatic valve for an inflatable object is simple in construction since it requires only a disc or patch to be inserted on the interior wall of the article to be inflated at the time of manufacture through a bonding operation such as vulcanization.

Therefore, it is the principal object of this invention to provide an improved self-sealing valve for an inflatable object.

Another object of this invention is to provide a simplified pneumatic valve for inflatable objects which may be located at any point thereon.

A further object of this invention is to provide an improved pneumatic valve for inflatable objects, such as tires, which present no obstruction to the exterior surface of the tire casing.

A still further object of this invention is to provide a simplified pneumatic valve which is low in cost, simple to manufacture and easy to use.

These and other objects of this invention will become apparent from a reading of the attached description, together with the drawings, wherein.

Figure 1:
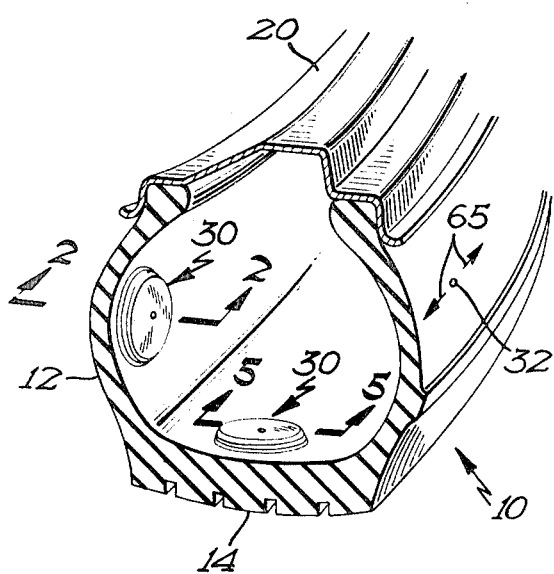
FIG. 1 is a perspective view of a tire casing in section showing several mountings for the improved pneumatic valve.

My improved self-sealing valve for an inflatable object is shown in the drawings in connection with a vehicle tire of the tubeless type, but it will be understood that it is equally applicable to tubes for tire casings or similar inflatable objects. In FIG. 1, a portion of a tire casing is shown generally at 10 having sidewall portions 12 and a crown or tread portion 14 and being normally mounted on a wheel support or rim, indicated in section at 20. My improved valve eliminates the need for a conventional valve stem which fits through an aperture in the wheel or rim and positions the valve in the tire casing itself. In FIG. 1, such a valve is shown generally at 30 as positioned in either the crown or tread portion of the tire or in the sidewall portion to indicate that it may be located in a variety of positions for convenience. Similarly, one or more such valves may be incorporated into a tire casing, as desired.

Figure 2:
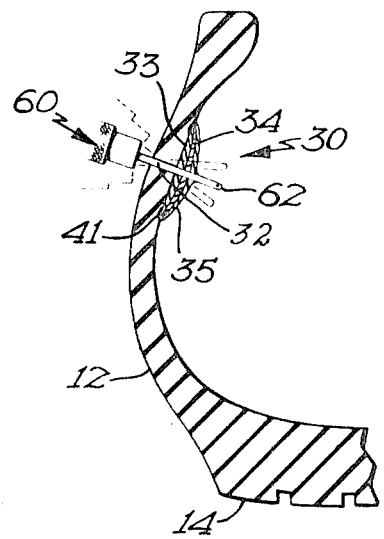
FIG. 2 is a sectional view of the tire casing of FIG. 1 disclosing the improved valve in section and along the lines 2-2 in FIG. 1.
Figure 5:
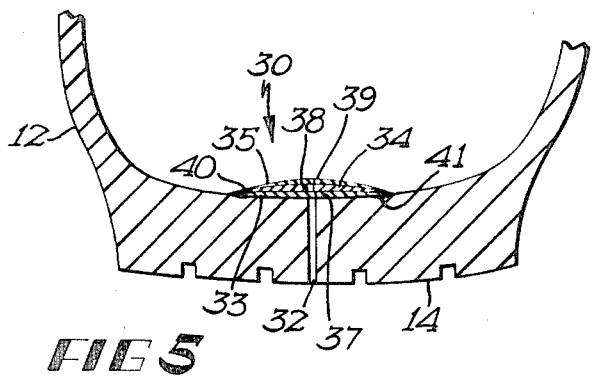
FIG. 5 is a sectional view of the valve of FIG. 1 taken along the lines 5-5 therein.
Figure 3:
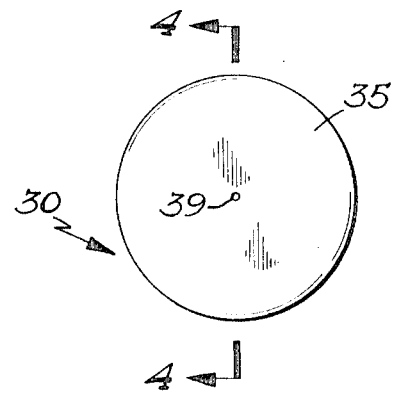
FIG. 3 is a plan view of the valve removed from the casing.
Figure 4:
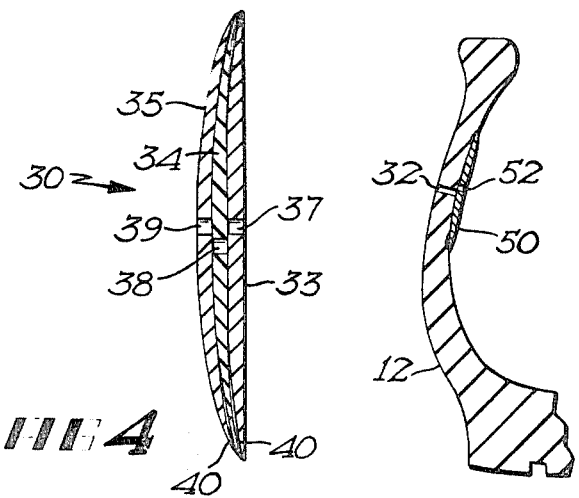
FIG. 4 is a sectional view of the valve in FIG. 3 taken along the lines 4—4 therein.

FIG. 2 shows a sectional view of the valve located in the sidewall of the casing. The valve 30 incorporates an aperture 32 positioned through the sidewall and a plurality of layers 33, 34 and 35 of an elastic and deformable material, such as thin rubber discs, the layers being sealed or bonded around the peripheral edge and having apertures 37, 38 and 39 respectively positioned therein. The valve 30 is shown in plan and section view in FIGS. 3 and 4 in an enlarged form to indicate the relationship of the layers or discs and the apertures therein. The aperture 32 would generally be of a one-sixteenth inch diametrical dimension and the apertures 37—39 would similarly be of the same diametrical dimension. The discs may vary in shape but will generally be disclike or circular with a thickness dimension of from 0.015 to approximately 0.030 thickness at the midpoint and tapered toward their peripheral edge to an approximate thickness of about 0.010 of an inch. The discs would be normally of the same shape and dimension and would be sealed or bonded around their peripheral edge to one another, as at 40, through a suitable sealing operation, such as vulcanizing. The apertures 37, 38 and 39 therein would be aligned so that adjacent layers would have their respective apertures offset from one another with the offset being such that the apertures would not be in an overlapping relationship. Preferably, the distance between center lines of the apertures in adjacent layers would be spaced apart a distance slightly greater than the diametrical dimension of the aperture itself and less than twice the diametrical dimension. The valve assembly would be sealed to the wall of the casing surrounding the aperture 32 therein through a similar sealing or vulcanizing operation, as at 41, and with the apertures in the discs or layers being similarly offset from the aperture in the casing. In the operation of the valve to introduce air or other inflation medium into the object or casing, a needlelike tubular member is introduced through the aperture in the casing and twisted or tilted with respect to the aperture such as to deform the rubber or material adjacent the valve and similarly the layers of the valve as the needle or tubular member is tilted, such as is shown in phantom in FIG. 2, until the needle has been advanced through the layers of the valve and with the aperture therein exposed to the interior of the casing for the purpose of transmitting the inflating medium thereto. After the inflation, the needle or filling tubular member is simply withdrawn allowing the deformable layers to return to their original position in which air pressure within the object or tire will cause the layers to press against one another sealing the opening made by the tubular member in the deformation of the layers and hence sealing the tire or inflatable object. The same construction is shown in FIG. 5 with a three layer or disc valve member positioned in the crown or tread portion 14 of the tire casing 10 and the filling or inflation operation is effected in the same manner through an aperture 3a in the crown portion of the casing which may be located in the tread ridge or groove.

Figure 6:
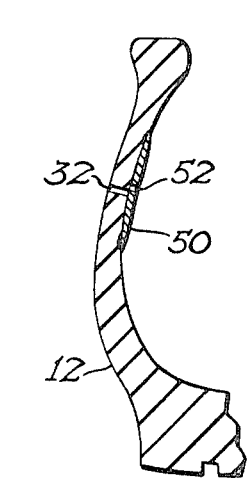
FIG. 6 is a sectional view of the portion of a tire casing showing an alternate embodiment of the pneumatic valve.

FIG. 6 shows an alternate embodiment of the valve utilizing only a single layer or disc. Thus, as will be seen in FIG. 6, the sidewall 12 of the casing has the aperture 32 therethrough and a single disc or layer of thin elastic deformable material, preferably rubber, is indicated at 50 positioned over the aperture. The disc or layer 50 has an aperture therein, as indicated at 52, which is offset from the aperture 32 in the wall and the disc is sealed or bonded through any suitable means to the wall of the casing. It will be understood that while a single layer or disc is employed herein, it may be supplemented by a two layer valve unit or a plural number of layers such as is indicated by three layers in the preferred embodiment. Proper sealing qualities have been found to exist with a single layer disc but plural layer configuration while requiring more time to insert the valve needle provides an overall improved arrangement in that it protects against mechanical failure, tearing or the equivalent over the single layer.

Figure 7:
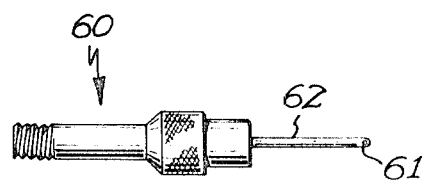
FIG. 7 is an elevation view of a filler tube to be used for the improved pneumatic valve.

The filler needle, which is indicated at 60 in FIG. 7 and in phantom in FIG. 2, may take any form and may include a check valve to prevent escape of air from the tire when the needle is inserted therein during the filling operation. This would be particularly true where it is desired to check pressure with a separate gauge as the object or tire is inflated. The particular configuration of the filling stem or tube forms no part of the present invention and merely provides a passage for the inflating medium to be directed from a pressure source therethrough and to an aperture indicated at 61 in the needle portion 62 thereof for the means of transmitting the inflation medium to the interior of the object or casing.

The improved self-sealing valve, as indicated in the various embodiments, may be applied at any point to the casing either on the sidewalls or crown thereof or to the interior of the tube and suitable marking, such as indicated at 65 in FIG. 1, will normally be incorporated on the exterior of the casing to indicate the direction of offset of the apertures in the valve discs. The discs may take any particular shape or configuration and need only be sealed or bonded around the aperture through the casing or wall of the object so that the only passage therebetween will be the aperture therein through which the filling needle will be worked or directed in the filling operation. The improved self-sealing valve presents no obstruction on the exterior surface of the object or casing, thereby providing an improved self-sealing valve which presents no obstruction to be damaged by environmental conditions with usage of the inflated object. Similarly, the valve contains no metal or moving parts and positive seal is obtained by the pressure within the container or object.

What I claim is:

1. The combination of a self-sealing valve and an inflatable object comprising, a hollow inflatable object having a predetermined wall thickness with at least a portion of said wall being made of a deformable and expandable material, an aperture positioned through the wall of the object, a thin flexible piece of elastic and deformable material sealed to the wall of the object about the aperture therein and having a thickness dimension substantially less than the wall thickness of the object surrounding the aperture, said thin flexible piece of elastic material having an aperture in the wall of the object, said apertures in the walls of the object and in the thin elastic deformable material having substantially the same diametrical dimensions and being offset such that the axes of the apertures are spaced apart a distance slightly greater than the diametrical dimension of said apertures, but less than twice the diametrical dimension of the apertures, and a hollow tubular member adapted to be inserted through the aperture in the wall of the object and the aperture in the think elastic material sealed to the inner wall of the object by deforming the thin elastic material, the pressure of the inflating medium introduced through the hollow tubular member into the inflatable object causing the thin flexible elastic material to conform to the inner wall of the object to seal the aperture therethrough.

2. The combination of the self-sealing valve and inflatable object of claim 1 in which the inflatable object is a tire casing.

3. The combination of the self-sealing valve and inflatable object of claim 2 in which the aperture positioned in the wall of the object is positioned in the sidewall of the casing of the tire.

4. The combination of the self-sealing valve and inflatable object of claim 2 in which the aperture in the wall of the tire casing is positioned in the crown portion of the casing.

5. The combination of the self-sealing valve and inflatable object of claim 1 in which the thin flexible piece of elastic and deformable material includes a plurality of layers of materials sealed at their peripheral edges with offset apertures in each layer and with the layer contacting the inner wall of the inflatable object being sealed thereto.

6. The combination of the self-sealing valve and inflatable object of claim 5 in which the plurality of layers of elastic and deformable material include at least three layers and in which said layers of said plurality of layers in nonadjacent relationship have apertures therein which are aligned and with at least one of the apertures in the plurality of layers being aligned with the aperture in the wall of the object.

7. A self-sealing valve for a tire casing comprising, a tire casing including a mounting for the same, an aperture positioned in the tire casing and extending from the exterior surface to the interior surface of the same and positioned remote from the support for the casing, and at least one disc of a thin flexible elastic deformable material positioned on the interior surface of the casing and sealed thereto over the aperture in the wall of the casing, said thin flexible elastic disc having an aperture therein positioned in adjacent and nonoverlapping relationship with the aperture in the wall of the casing, said apertures in the wall through the casing and in the thin elastic deformable disc have substantially the same diametrical dimension and are offset such that the axes of said apertures are spaced at a distance slightly greater than the diametrical dimension of said apertures but less than twice the diametrical dimension of the apertures.

8. The self-sealing valve of claim 7 in which the thin flexible disc of an elastic and deformable material includes a plurality of layers of material each with a separate aperture therethrough and with the apertures in said layers being offset a distance no greater than a spacing of twice the diametrical dimension of the apertures.

9. A self-sealing valve for an inflatable object comprising, a disc formed of a plurality of layers of a thin flexible elastic and deformable material in which the layers are sealed at the circumferential edge of the same and in which each layer has an aperture therethrough substantially the same diametrical dimension with the apertures in adjacent layers being offset from one another to be in nonoverlapping relationship and with apertures in noncontacting layers being disposed along the same axis.

UNITED STATES PATENT OFFICE
CERTIFICATE OF CORRECTION

Patent No. 3,584,671　　　　　　　　Dated June 15, 1971

Inventor(s) Donald J. Kampa

It is certified that error appears in the above-identified patent and that said Letters Patent are hereby corrected as shown below:

Claim 1, Line 67, after "aperture", insert the following

-- therethrough which is disaligned with the aperture --;

"　　" Line 8, after "in the", delete "think" and insert the following -- thin --.

Signed and sealed this 7th day of December 1971.

(SEAL)
Attest:

EDWARD M. FLETCHER, JR.　　　ROBERT GOTTSCHALK
Attesting Officer　　　　　　Acting Commissioner of Patents